United States Patent [19]

Black

[11] Patent Number: 5,477,771

[45] Date of Patent: Dec. 26, 1995

[54] HYDRAULIC CYLINDER ASSEMBLY

[76] Inventor: Philip B. Black, 3616 N. Harding Blvd., Chicago, Ill. 60618

[21] Appl. No.: 103,950

[22] Filed: Aug. 10, 1993

[51] Int. Cl.⁶ .................................................. F01B 31/12
[52] U.S. Cl. ............................. 92/5 R; 92/108; 92/113; 92/128
[58] Field of Search ............................. 92/5 R, 108, 109, 92/113, 114, 128; 91/1

[56] References Cited

U.S. PATENT DOCUMENTS

| 4,140,044 | 2/1979 | Biller et al. | 92/5 R |
| 5,150,049 | 9/1992 | Schuetz | 92/5 R |

FOREIGN PATENT DOCUMENTS

| 636161 | 2/1962 | Canada | 91/1 |

*Primary Examiner*—F. Daniel Lopez
*Attorney, Agent, or Firm*—Wayne L. Tang; Keck, Mahin & Cate

[57] ABSTRACT

A LDT dry well consisting of a stainless steel tube closed at one end and welded to an adapter piece on the opposite end is attached is threaded into the rear of the cylinder and the stainless steel well extends into the cylinder. Inside the tube, the LDT is mounted and threaded into the adapter on the rear of the well. The device therefore seals the LDT from the hydraulic fluid and permits the removal of the LDT from the cylinder without loss of any fluid. The cylinder can be maintained at pressure during and in operation during the replacement operation even though the feedback device is removed.

10 Claims, 5 Drawing Sheets

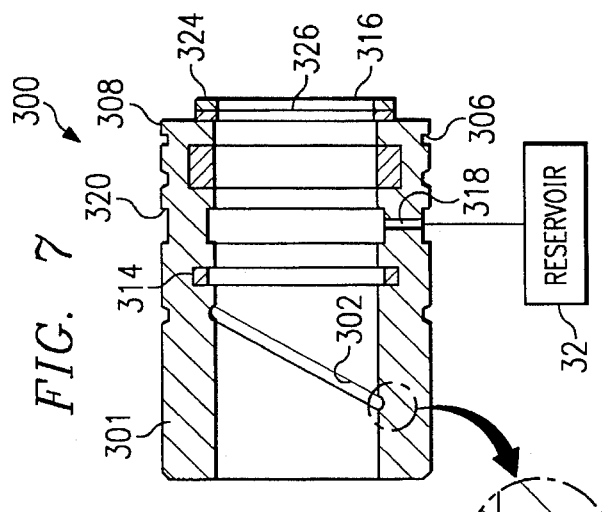
FIG. 7
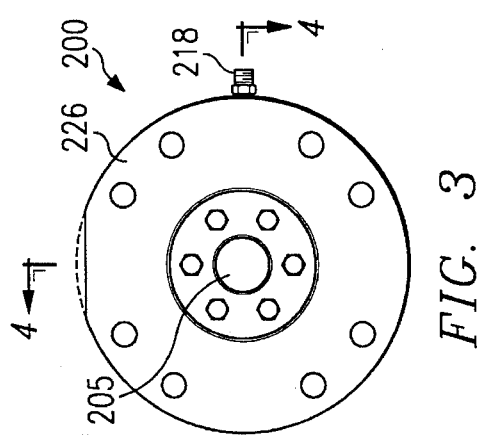
FIG. 3
FIG. 8
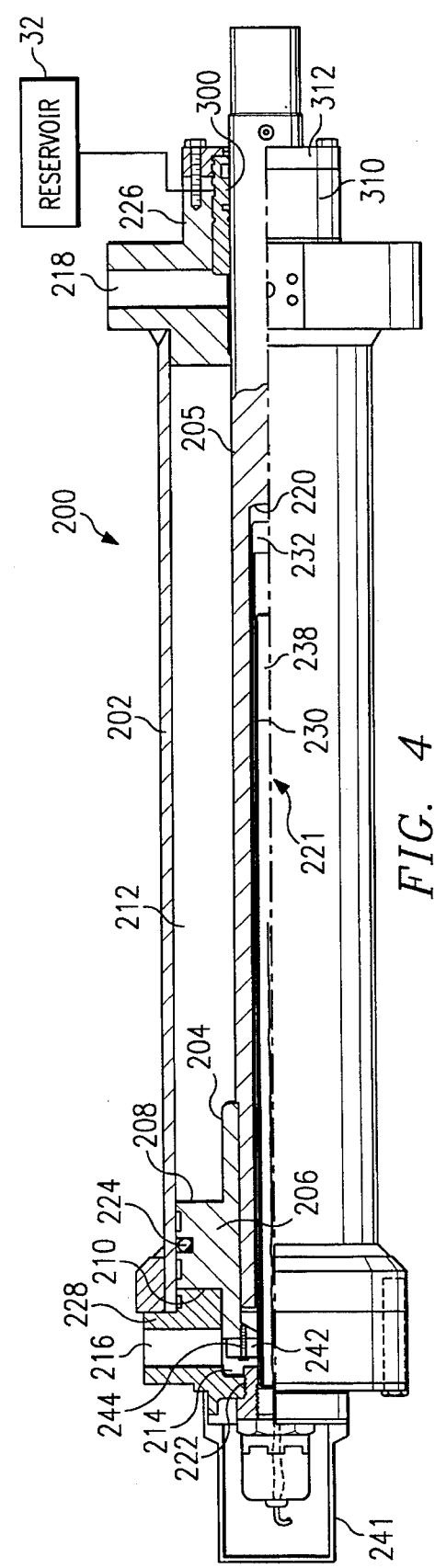
FIG. 4

HYDRAULIC CYLINDER ASSEMBLY

FIELD OF THE INVENTION

The present invention relates to an improved hydraulic cylinder assembly for application to critical processing functions, and more particularly, to an improved replaceable hydraulic cylinder displacement sensing device.

BACKGROUND OF THE INVENTION

Hydraulic cylinders have been used for the actuation of valves for many years. However, advances in microprocessor based control systems now require an accurate and dependable feedback signal to determine valve position during operation.

This need for accuracy in positioning is especially acute in fluidized catatylic cracking units (FCCU) used in the refining of petroleum products. The plug valves therein utilized require actuator control of the position of the plug valve to very high degrees of accuracy since very small movements of the conically shaped plug valve can result in non-linear proportional changes in the flow area, and resultant mass flow, by several percentage points. In the case of the typical older FCCU plug valves actuators which operate ,with the regenerated catalyst plug valves and to therefore control the temperature of the riser, a movement of less that 0.030 inch will change the temperature of the riser 1 degree Fahrenheit. This critical movement therefore affects the flow performance, the yield, and the stability of the FCCU.

The method of producing accurate position control has in the past been accomplished through the use of linear variable displacement transducers (LVDT) mounted by various manufacturers in the actuator and within the cylinder. The more modern method of measuring valve position is to indirectly measure piston position through a linear displacement transducer (LDT) using electronic components mounted within the cylinder. The LDT measures the actual piston position inside the cylinder and a signal is sent to the position control amplifier corresponding to that particular piston position. These devices fit in the rear of the cylinder directly. The position control amplifier compares the feedback position to that of a command signal from the process distributive control system. From this comparison a signal is produced to correct any error that exists in position as a difference between the two signals. This correction error signal is sent to the servo valve which converts the electronic signal into hydraulic fluid movement directed to the hydraulic cylinder. This error signal can also be used for alarming a control room if nominal operating parameters are exceeded.

However, such systems suffered from a major drawback. If for any reason the LDT should fail, its replacement required the entire hydraulic cylinder to first be removed from service. In the context of a FCCU, this is a dangerous and expensive operation. Moreover, to remove the LDT of previous systems from the cylinder, the cylinder must first be depressurized. Any remaining fluid would flow or leak out. If this operation is done in the field, as is often the case, the leaking of hydraulic fluid creates an extremely hazardous event. With a flash point of 325° F. and the surrounding processing lines having skin temperatures sometimes exceeding 600° F., the risk of fire (and potential explosion of the entire FCCU) is not trivial. Also, the hydraulic fluid, at elevated temperatures given this particular environment, creates a direct hazard for repair crews. Moreover, the leakage of hydraulic fluid, even in relatively small amounts (i.e., one gallon) is now an event which must be reported to the United States Environmental Protection Agency. Thus, solutions were sought to end the dangers caused by leakage arising from the replacement of LDT units.

SUMMARY OF THE INVENTION

The present invention comprises the use of a LDT dry well as a new development for hydraulic cylinders. The device consists of a stainless steel tube closed at one end and welded to an adapter piece on the opposite end. This adapter end of the dry well is threaded into the rear of the cylinder and the stainless steel well extends into the cylinder. Inside the tube, the tubular LDT unit, is mounted and threaded into the adapter on the rear of the well.

The device therefore seals the tubular LDT unit from the hydraulic fluid and permits the removal of the LDT from the cylinder without loss of any fluid. The cylinder can be maintained at pressure and in operation during the replacement operation even though the feedback device is removed.

The forgoing is accomplished through a hydraulic cylinder having a partially hollow piston capable of axial displacement. The well or first tubular fluid barrier member is axially disposed within the partially hollow piston. A first magnetic field generator or magnet is attached to the piston for generating a first magnetic field. A second magnetic field generator is axially disposed within a second tubular member removably coupled to and axially disposed within the first tubular barrier member and includes an electrical circuit which generates a second magnetic field. A further electrical circuit disposed in the second tubular member generates an induced electrical signal in response to the interaction of the first and second magnetic fields, where sensing means sense the electrical signal and thereby determines the axial position of the piston and the coupled valve.

OBJECTS OF THE INVENTION

In accordance with aforementioned Summary of the Present Invention, of the primary object of the present invention is to obtain a device for accurately determining the position of a valve through precise measurement of the position of the piston of a hydraulic cylinder.

A further object of the present invention is to obtain such a device through the use of a readily replaceable tubular LDT unit sensor.

Another object of the present invention is to obtain such a device wherein the replacement process is safe and inexpensive.

Still another object of the present invention is to obtain such a device where the replacement operation may be accomplished with the cylinder still in operation.

Yet another object of the present invention is to obtain such a device where the replacement operation may be accomplished without depressurizing the cylinder.

Still a further object of the present invention is to obtain such a device where fluid does not leak out.

Another object of the present invention is to obtain such a device where any remaining fluid inside the cylinder does not create a hazard of fire and explosion by leaking out.

An additional object of the present invention is to obtain such a device where any remaining fluid does not a direct hazard for repair crews.

A further object of the present invention is to obtain such a device where the leakage of hydraulic fluid, even in relatively small amounts, and environmental damage therefrom is prevented.

These and other objects and advantages of the present invention will be more apparent from the following detailed description of the preferred embodiment when taken in conjunction with the accompanying drawings.

BRIEF DESCRIPTION OF THE DRAWINGS

FIG. 3 is an end view of the hydraulic cylinder of the present invention;

FIG. 4 is a partial sectional side view of the hydraulic cylinder of the present invention taken along the lines 4—4 of FIG. 3;

FIG. 7 is a sectional view of the replaceable bearing gland for the hydraulic cylinder of the present invention;

FIG. 8 is a detailed view of the helical oil groove and seals of the replaceable bearing gland for the hydraulic cylinder of the present invention;

DETAILED DESCRIPTION OF THE PREFERRED EMBODIMENT

Figure 1:
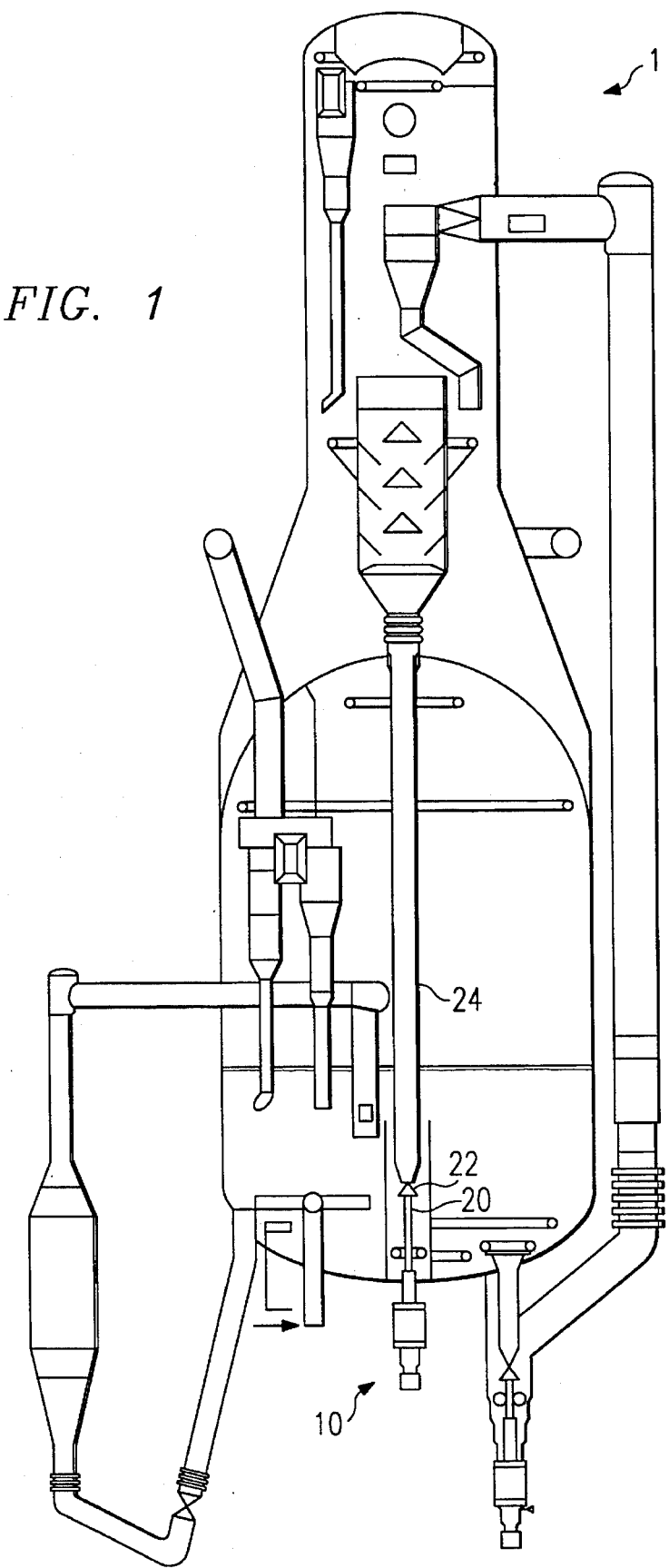
FIG. 1 is an overview of a fluidized catatylic cracking unit (FCCU) typically used in the refining of petroleum products, showing the valve actuator to which the improved hydraulic cylinder of the present invention may be applied in situ.

For the purpose of promoting an understanding of the principles of the invention, reference will now be made to the embodiment illustrated in the drawings and specific language will be used to describe the same. It will nevertheless be understood that no limitation of the scope of the invention is thereby intended, such alternations and further modification in the illustrated device, and such further application of the principles of the present invention as illustrated therein being contemplated as would normally occur to one skilled in the art to which the invention relates.

With reference to FIG. 1, an application of the preferred embodiment of the improved hydraulic valve actuator 10 is shown. Shown is an overview of a fluidized catatylic cracking unit (FCCU) 1. Those skilled in the art will readily appreciate that such structures are used in the refining of petroleum products and can often be over twelve (12) stories tall. At the base of the FCCU unit 1 is the valve actuator 10 to which the improved hydraulic cylinder of the present invention may be applied. It can be seen coupled to a valve stem 20 supporting conical plug valve 22. Conical plug valve 22 controls the flow of catalyst flowing through the standpipe 24. Thus, the hydraulic valve actuator must properly manage the flow of the standpipe 24 against the conical plug valve 22 during heatup of the FCCU.

Figure 2:
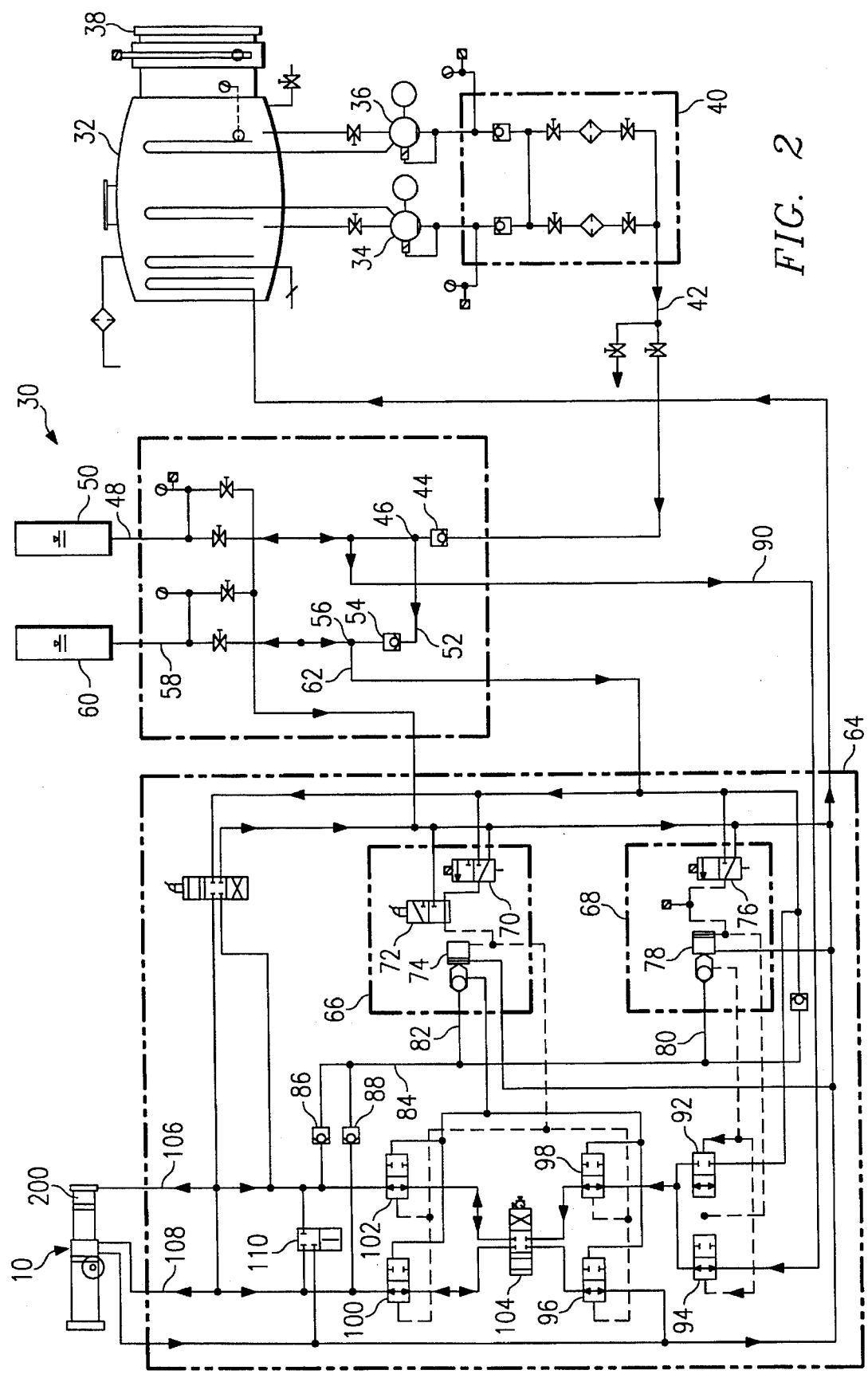
FIG. 2 is a schematic view of the hydraulic control system of the hydraulic cylinder of the present invention.

A general overview of the hydraulic control system 30 for the hydraulic valve actuator of the present invention is shown in FIG. 2. A reservoir 32 provides hydraulic pumps 34, 36 with sufficient hydraulic fluid for pressurization to system pressures, preferably 1500–1800 psig. The pumps must be of very high quality, heavy duty, and extremely efficient design. These pumps, manufactured by Bosch, are preferably at least 93 percent efficient, rated to 4900 psig, with a lifespan of 12 years. A sight glass 38 allows monitoring of the fluid level within the reservoir 32. The fluid is directed through a series of lines comprising a filter manifold 40 and directed along line 42 to check valve 44 and to tee 46. The fluid is then directed alternatively along line 48 to main pressure vessel 50, main supply line 90, or through line 52 to check valve 54 and to tee 56. The fluid is further alternatively sent through line 58 to reserve pressure vessel 60 or through supply line 62 to a main control manifold 64.

Main control manifold 64 includes a lock-in-place-control block 66 and a reserve-accumulator-control block 68. The accumulator pressure of block 68 maintains the thrust of the conical plug valve 22 against the seat of the standpipe 24 whether or not there is power to the actuator position control electronics. System pressure can also be zero, yet this accumulator will be available in all cases to maintain the valve closed position. Also in the case of the heat up of the FCCU during a situation where no power exists, the valve remains closed due to the pressure of the accumulator. This means that assured positive closure of the plug valve in an emergency and non-emergency context is accomplished. Lock-in-place-control block 66 further includes in series, hydraulic solenoid 70, hand valve 72, and pilot selector valve 74. Reserve-accumulator-control block 68 includes solenoid 76 and pilot selector valve 78. In the event of hydraulic fluid pressure loss, lock-in-place-control block 66 prevents retraction of the valve 22 from the standpipe 24. The output from the lock-in-place-control block 66 and reserve-accumulator-control block 68 flows through lines 80 and 82, respectively to line 84, which in turn is connected to check valve 86, 88.

The main supply line 90 is further directed to a series of pilot control valves 92 through 102 and servo valve 104. These valves are in turn controlled by a control circuit (not shown) as is known in the art. Ultimately, the hydraulic lines emerge as lines 106 and 108 which directly control the operation of the hydraulic cylinder 200 of the valve actuator 10 of the present invention. A handwheel bypass valve 110 is provided to allow manual override of the hydraulic system, as will be explained below.

Referring now to FIGS. 3 and 4, there is shown the hydraulic cylinder 200 of the valve actuator 10 of the present invention. The cylinder 200 is primarily comprised of an outer casing 202 and an extendable piston 204 connected to a piston rod 205. The piston 204 has a base portion 206 on which pressure responsive surfaces 208, 210 are provided and which functionally divides the interior of the casing 202 into two operational pressure chambers 212 and 214. Extension pressure chamber 214 is in fluid communication with supply line 108 through port 216, while retraction pressure chamber 212 is in fluid communication with supply line 106 through port 218. Extending coaxially from the base portion 206 into the cylinder 200 and piston 204 is cylindrical, tubular cavity 220, into which the LDT dry well 221 for the replaceable LDT according to the present invention may be placed.

The end of the casing 202 opposite the protruding piston rod 205 is further provided with a threaded orifice 222, which will be discussed below. Piston seals 224 are provided on the base portion 206 to further provide separation of the pressure chambers 212, 214. The cylinder 200 is a "mill" type cylinder, meaning that a front endcap 226 of the cylinder is welded to the heavy wall tube defining the outer casing 202. The rear end cap 228 bolts to a flange which is also welded to the outer casing 202. This means the cylinder is rigid, heavy, and will not stretch and loosen as may other cylinders available in the industry. The hydraulic cylinder 200 preferably has a duty cycle of continuous modulating service of 0.5 inch every 3 seconds average for life.

The piston rod 205 is preferably a hardened stainless steel rod with double hard-chrome plating. This provides a piston rod 205 which does not flake off chrome plating due to corrosion of the base metal as carbon steel cylinder rods in typical designs have done due to rust.

Figure 5:
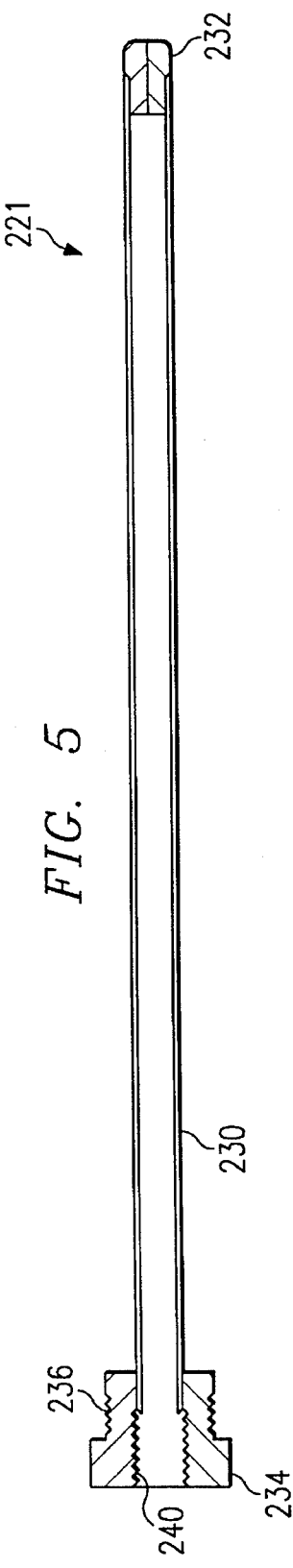
FIG. 5 is a sectional view of the LDT well of the improved hydraulic cylinder of the present invention.
Figure 6:
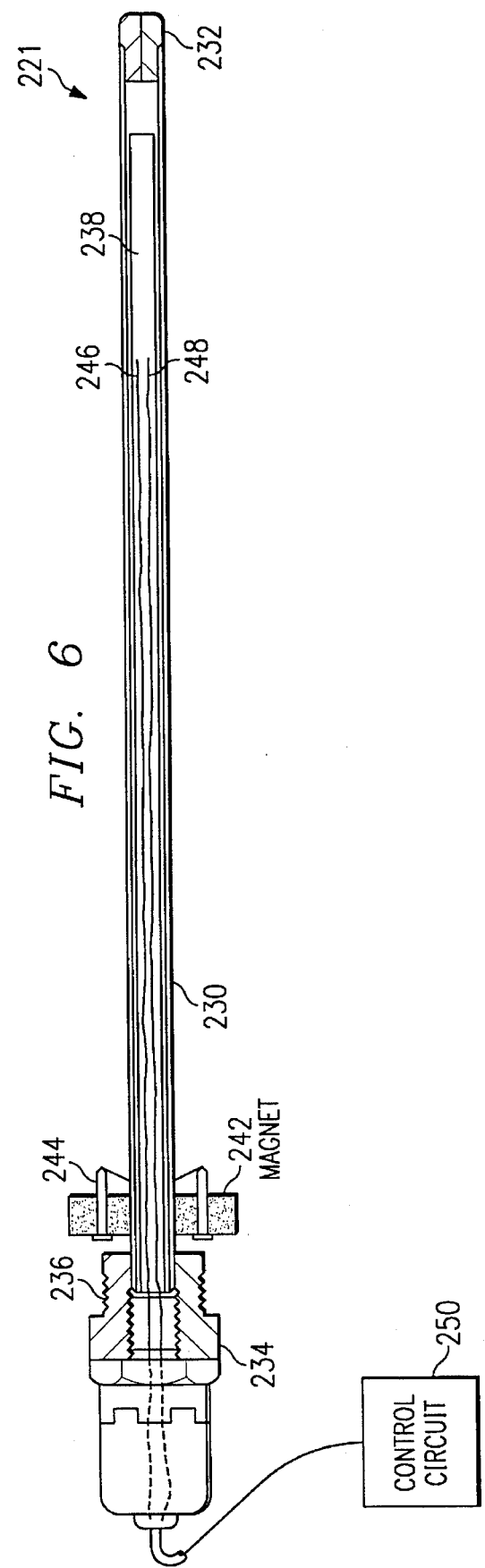
FIG. 6 is a sectional view of the LDT well and LDT of the improved hydraulic cylinder of the present invention.

The LDT dry well 221, better viewed in FIGS. 5 and 6, is preferably made of 304 stainless steel. This material is a weldable material and is designed to withstand the test pressures and burst test of the cylinder. A side benefit of this well is that it protects the tubular LDT unit 238 from shocks in the hydraulic fluid system.

The tubular LDT unit 238 itself is contained within the LDT dry well 221 cylinder and is protected from the elements and electrically housed in an explosion-proof enclosure. No bolts are required to be removed or electrical wiring removed from terminals to remove the transducer. Under field conditions the LDT may be removed for replacement without loss of fluid while cylinder 200 and actuator 10 are in use. This is extremely useful since the critical operation of the actuators requires the actuator 10 to operate continuously 365 days a year for up to five years at time. If the feedback device can be replaced while the actuator 10 continues to operate through the redundant positioning control system, the operation of the plant is safe and assured.

This important aspect of the present invention was developed to permit replacement of the feedback device online during operation. Until this development, if the feedback device ever failed, the actuator 10 would become inoperable while the device was changed, leading to unsafe conditions within the refinery or power plant. These unsafe conditions include the potential of destructive explosions because of lack of control from the actuator 10 in refinery and in power plant applications.

Cylinder 200 for the preferred application is preferably designed for 3,000 psig with hydrotest of 6,000 psig, burst pressure of 12,000 psig, and shock loads to 10,000 psig. The LDT dry well 221 is preferably rated for 3,000 psig operating pressures with the functional tubular LDT 238, manufactured by MTS, Research Triangle Park, N.C., requires a temperature operating range of −40° to 185° F. It has been found that the actual operating conditions normally exist in the range of −40° to 150° F.

The LDT dry well 221 includes a stainless steel tube 230 closed at one end with a plug 232 and welded to an adapter piece 234 on the opposite end. This adapter piece 234 of the LDT dry well 221 is provided with a threaded portion 236 which threadingly engages the threaded orifice 222 on the rear end cap 228 of the cylinder 200. Inside the tube 230, a tubular LDT unit 238 is mounted and threaded into an interior threaded orifice 240 in the adapter piece 234 attached to the rear of the dry well 221.

The operational components of the tubular LDT unit 238 further includes a magnet 242 positioned concentrically and slidably about the outer surface of the dry well tube 221 and attached as shown through fasteners 244 to the base portion 206 of the piston 204. The magnet 242 thus is free to travel axially and faithfully follows the motion of the piston 204 throughout its range of motion. As is well known in the art in the operation of LDTs, the magnet 242 is used to generate a first magnetic field. A second magnetic field generator or electrical line 246, disposed within the tubular LDT unit 238 and thus axially disposed within the LDT dry well 221 is used to generate a second magnetic field. A 1–5 volt pulsed signal operating at about 12 MHz is provided to the line 246. An additional electrical circuit disposed within the tubular LDT unit 238 generates an induced electrical signal in the line 248, reflecting the interaction of the first and second magnetic fields. In the control circuitry 250, the signal is sensed to thereby determine the axial position of the piston 206 and the coupled valve 22.

The LDT dry well 221 is threadingly attached to the cylinder rear endcap 228. The fluid barrier created by the endcap 228 and the LDT dry well 221 not only prevents fluid dropping out of the rear of the cylinder during replacement of the tubular LDT unit 238 if it fails, but also since the dry well 221 is preferably designed to handle high pressure and pressure shocks, the cylinder 200 is able to continue operation at normal system pressures. Therefore, the dry well 221 allows the user of the cylinder 200 a method to continue normal operation which is critical to the refinery or the power utility process. A service cap 241 is mounted to the endcap 228 to further protect the tubular LDT unit 238 already threadingly attached to the adapter 234 of the LDT dry well 221 attached thereto.

In response to the signals received at the control circuitry 250, signals are sent to the pilot control valves 92 through 102 and servo valve 104 to cause the pressure difference between the chambers 212, 214 to equal the desire force limit.

The position control electronics utilize a microprocessor for this service. The electronic controller must not be not susceptible to RFI and noise from other sources in the transmittal of signals for control. Further, continuous monitoring of all temperatures and pressures of the control assembly can optionally provide automatic control of the redundant solenoid valve positioning system if a servo valve does fail.

Figure 9:
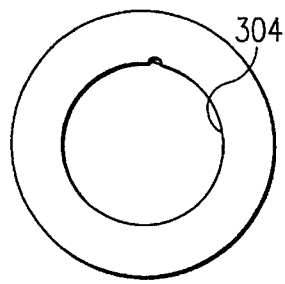
FIG. 9 is an end view of the replaceable bearing gland for the hydraulic cylinder of the present invention.

Shown in FIGS. 7, 8 and 9 is a further preferred embodiment of the cylinder 200 of the present invention which includes a cylinder seal design incorporating several separate features which extend the lifespan and reliability of the seals and piston rod. Specifically, according to the following features the negative effects of catalyst handling and valve stem seal failure which permits tons of hot catalyst to blast out of the valve toward the hydraulic cylinder, and the misalignment of the cylinder with respect to the valve stem are avoided to extend the life of the cylinder and seal assemblies.

The piston rod bearing gland assembly 300, assembled on a cylinder sleeve 301 according to the present invention provides a lubricated bearing surface length equal to 1.5 times the rod diameter. This prevents galling of the rod surface when sideloading or bending of the cylinder rod 205 occurs due to poor lubrication, where tolerances between the outer surface of the piston rod 205 and the inner surface 304 of the gland assembly 300 are about 0.001 inch. Most rod bearings have surface lengths less than 1.0 times the rod diameter, and are not properly wetted by the hydraulic fluid. This leads to galling and scratches in the rod surface which leads to seal failure. Improved lubrication according to the present invention is further accomplished with a spiral, helical groove 302 machined into the inner surface 304 of the gland assembly 300. The spiral, helical groove 302 permits the fluid from the cylinder to flow up the along length of the bearing surface of the gland.

The gland assembly 300 is also removable from the cylinder and can be replaced with a new gland assembly 300 inclusive of all seals and wipers. This permits the removal of the gland assembly 300 while the cylinder is mounted in the installed position of operation. The gland incorporates a lip 306 at an outer edge 308 which can be used to pry the gland assembly 300 out of the front of the extended gland housing portion 310 of the cylinder after removal of the gland cover plate 312.

The extended configuration of the rod gland housing 310 is also beneficial. This design allows the required extra length for the extended rod bearing gland assembly 300 while maintaining its accessibly for replacement, as noted above. The rod gland housing 310 extends through the mounting plate thickness so the outer edge 308 of the gland assembly 300 is exposed.

A primary hydraulic oil seal 314 is teflon based impregnated with bronze and has sharp edge seals. These seals are more rugged than other types of seals available. The design is such that it does not prevent leakage to zero, but rather has a continuous low volume seepage when under the higher pressures existing in the pressure chamber 212. This design permits the hydraulic fluid to continuously move through the seal surface, preventing outside contamination from entering the cylinder.

A second seal 316 is a standard energized zero-leak polypak type seal used to prevent all fluid from exiting the cylinder. This seal is not operated at significant pressure. Any fluid excess leaking past the primary seal 314 is retained and flows back to the reservoir via a port 318 and annular groove 320 between the two seals 314, 316 to return to the reservoir 32.

The function and reliability of these seals is critical. As noted above, leaking hydraulic fluid can become a source for fire hazard which in the industrial world is extremely dangerous, potentially causing explosive conditions, or injury to personnel through fire. Second, leaking hydraulic fluid in the U.S. must be reported to the U.S. Environmental Protection Agency if quantities greater than 1 gallon is spilled. Though the hydraulic fluid is not a hazardous material itself, when mixed with rain or any form of water, it is considered a toxic product and must be contained and reported. The two primary seals 314, 316 act to eliminate fluid from ever getting onto the ground. Since the environmental standards have tightened, the gland assembly 300 helps by removing leakage from the cylinder and returning the fluid back to the reservoir 32.

Two rod wipers 324, 236 are used. One is a teflon wiper 324 and the other is a bronze wiper 326. Both are mounted in the front of the rod gland assembly 310 and retained in place by the gland cover plate 312. The teflon wiper is integral with the metal wiper. The metal wiper 326 is used at the outboard primary wiper to scrape the cylinder rod 205 clear of catalyst and fly ash. This action is then duplicated by the teflon wiper 324 in the rod gland to again clean the rod 205 as it pulls back into the cylinder. These two components wipe the rod absolutely clean and prevent damage to the primary seal 314 and secondary seal 316 from catalyst and fly ash.

The gland 300 thus provides a bearing fully lubricated under pressure and removable as an integral seal cartridge. This makes it possible to change the rod assembly seals 314, 316 easily while the cylinder is mounted on the actuator 10. Moreover, the seals 314, 316 are easily maintainable on the cylinder. In fact the cylinder can be left in place attached to the actuator 10 while being completely serviced.

Figure 12:
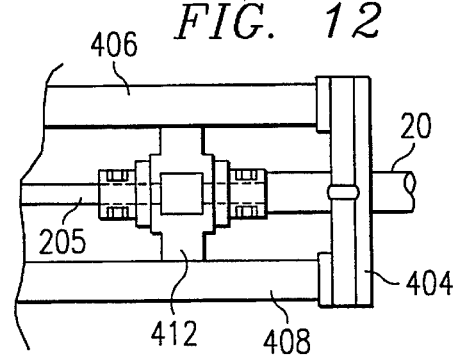
FIG. 12 is a partial sectional view of a portion of the improved hydraulic valve actuator to which the improved hydraulic cylinder of the present invention may be applied taken along the lines 12—12 of FIG. 10.
Figure 10:
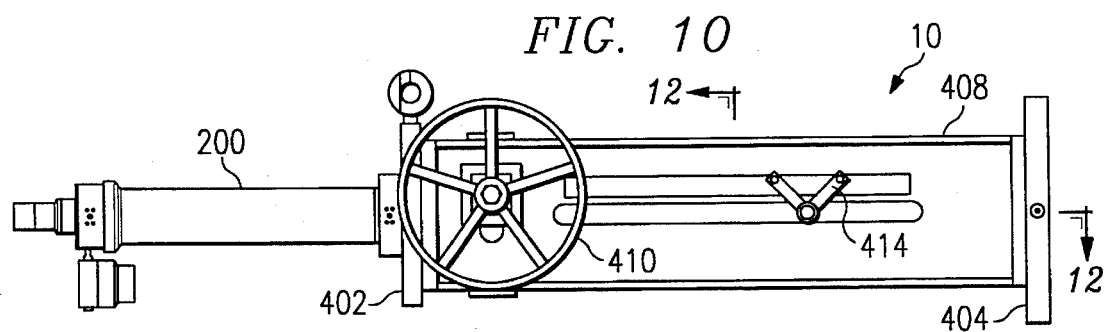
FIG. 10 is a side view of the improved hydraulic valve actuator to which the improved hydraulic cylinder of the present invention may be applied.
Figure 11:
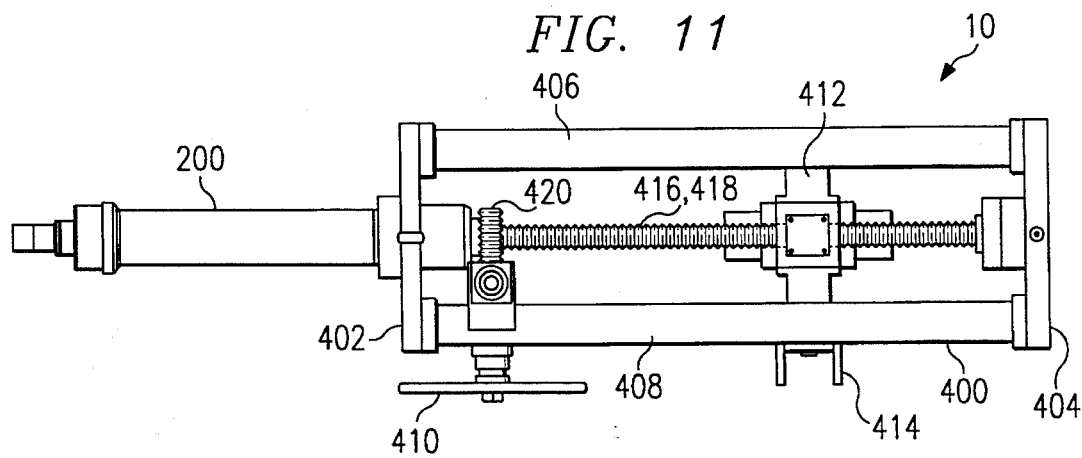
FIG. 11 is a top view of the improved hydraulic valve actuator to which the improved hydraulic cylinder of the present invention may be applied.

Shown in FIGS. 10, 11 and 12, is the overall actuator 10 to which the cylinder invention may be applied. The actuator 10 is built around a frame assembly 400 which includes two endplates 402, 404. Rigidly attached to endplate 402 is the front endcap 226 of the cylinder 200, with the piston rod 205 extending through an orifice (not shown) in the endplate 402. Extending frame members 406, 408 couple the endplates to form a rectangular box which can be enclosed to protect the components therein from the elements. As a safeguard, the valve can be manually actuated according the arrangement described below.

A handwheel mechanical positioner 410 is provided which can position the conical plug valve 22 if the hydraulic cylinder 200 has to be removed from service for any reason, though it is contemplated within the scope of this invention that such occurrences will is unlikely since cylinder 200 as disclosed can be completely maintained without removal from the actuator 10. The mechanical handwheel positioner 410 is constructed to be capable of 100,000 lbs. of thrust stall, with an impact load of 50,000 lbs. at 2 inches per second. As the handwheel positioner is the last resort, it must function without the possibility of failure, the mechanical handwheel positioner 410 is a brute strength device that can handle the difficult services of the FCCU.

An engagement device 412 is incorporated with an integral locking mechanism 414, shown in the non-engaged positions. Two acme screws 416, 418 (screw 418 is hidden from view below screw 416 in FIG. 11) provide a balanced driving force to the valve stem 20 (best shown in FIG. 12). Both screws 416, 418 are held in tension so as to eliminate possible buckling which may occur under maximum heavy loads.

As further shown in FIG. 12, the piston rod 205 is coupled to the engagement device 412. One end of the valve stem 20, extending through an orifice (not shown) in endplate 404, is likewise coupled to the opposite side of the engagement device. In normal operation, the engagement device is free to slide along tracks (not shown) placed on each of the inner surfaces of the frame members 406, 408. Thus, axial motion of the piston rod 205 is effective in obtaining axial motion of the engagement device 412 and coupled valve stem 30, as well as valve 22.

However, if it is necessary to manually position the actuator, a lockout system is provided though the engagement device 412. With the locking mechanism 414 in the engaged positions, half acme nuts are placed in engagement with the two acme screws 416, 418. Rotation of the handwheel 410 and the gear arrangement 420 thus provides a driving force to the engagement device 412 and the valve stem 20.

As noted above, the hydraulics must maintain the position of the actuator during the process of engaging the handwheel 410. This is required because when the handwheel 410 is engaged, the hydraulic servo control must first be locked out. The handwheel bypass valve 110 must be opened so as to bypass fluid from one side of the cylinder to the other. This produces a lack of valve position control since the valve 22 will open due to its own weight. This movement can be controlled through the use of mechanical relief valves in the balance lock in place control block 66 which further includes in hydraulic series solenoid 70, hand valve 72, and pilot selector valve 74. Thus, the weight of the valve 22 and valve stem 20 does not move it into the open position, until desired by the operator.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

I claim:

1. A hydraulic cylinder having an endplate with a threaded orifice and containing hydraulic fluid within at least one interior chamber comprising:

a hollow piston capable of axial displacement;

a hollow rod attached to said piston;

a first tubular fluid barrier member axially disposed within the hollow piston and said hollow rod, said first tubular fluid barrier member having an adapter piece fixedly attached to a first end thereof and a plug fixedly attached to a second end thereof, said adapter piece being adapted for mounting to the hydraulic cylinder endplate and sealing the interior chamber, said adapter piece being provided with a corresponding threaded portion adapted to be received by the threaded orifice of the endplate to create a sealed fluid barrier between the interior chamber of the cylinder and the exterior of the cylinder;

a first magnetic field generator attached to the piston for generating a first magnetic field adapted for axial displacement about the first fluid barrier member in accordance with motion of the piston;

a second magnetic field generator axially disposed within a second tubular member removably coupled to and axially disposed within the first tubular fluid barrier member for generating a second magnetic field;

an electrical circuit also disposed in the second tubular member for generating an electrical signal in response to the interaction of the first and second magnetic fields;

means for sensing the electrical signal and determining therefrom the axial position of the piston; and wherein said adapted piece is further provided with a threaded orifice and said second tubular member is provided with a corresponding threaded portion adapted to be received by the threaded orifice of the adapter piece to allow removal of the second tubular member without leakage of the hydraulic fluid.

2. The invention of claim 1 wherein the first magnetic field generator is a magnet.

3. The invention of claim 1 wherein the second magnetic field generator is a second electrical circuit energized with pulsed electrical energy.

4. The invention of claim 1 wherein said first tubular member is steel.

5. A hydraulic cylinder assembly comprising:

a cylinder having a first endplate having an orifice;

a first tubular member having an outer surface and a first end disposed in said orifice, said tubular member being axially mounted within said cylinder;

a piston disposed within said cylinder, said piston capable of axial displacement over said outer surface of said first tubular member, and dividing said cylinder into two chambers, each of said chambers containing hydraulic fluid; and a second removable tubular member being axially disposed within said first tubular member and having a position sensor means disposed therein, said second removable tubular member capable of being removed from said first tubular member without causing fluid to leak from said chambers containing hydraulic fluid.

6. The hydraulic cylinder assembly of claim 5 wherein said sensing means is an electrical line.

7. The hydraulic cylinder assembly of claim 6 further comprising:

a concentric magnet is attached to said piston, said magnet capable of axial displacement over said outer surface of said first tubular member;

a pulse generating circuit;

a second electrical line disposed within said second tubular member and connected to said pulse generating circuit; and a control circuit connected to said first electrical line, said control circuit capable of determining the axial position of said piston within said cylinder by measuring the electrical signal created in said first electrical line by said pulse generating circuit and said magnet.

8. The hydraulic cylinder assembly of claim 5 wherein said first tubular member is stainless steel.

9. The hydraulic cylinder assembly of claim 5 wherein said orifice is threaded and said first tubular member further comprises a threaded adapter capable of being threadibly engaged within said orifice.

10. The hydraulic cylinder assembly of claim 9, wherein said adapter further comprises an orifice allowing removal of second tubular member.

* * * * *